Jan. 31, 1967   R. E. DAVY   3,301,687

FOOD WRAPPER

Filed Sept. 3, 1965

INVENTOR.
ROBERT E. DAVY
BY Knox & Knox

United States Patent Office 3,301,687
Patented Jan. 31, 1967

3,301,687
FOOD WRAPPER
Robert E. Davy, La Mesa, Calif., assignor to Coroga Co., Anaheim, Calif.
Filed Sept. 3, 1965, Ser. No. 485,038
4 Claims. (Cl. 99—171)

The present invention relates to food packaging and more specifically to a food wrapper in which the food can be cooked and which serves as a holder for the food while being consumed, and is a continuation-in-part of my co-pending application Serial No. 311,388, filed September 25, 1963, now abandoned.

There are many food products which are prepared and served in individual portions and can conveniently be enclosed in wrappers which remain in place during cooking and serving. Such food items include tamales, meat or meat and vegetable mixes made in roll form or enclosed in a shell made of some type of pastry, or even fruit in a pastry shell in the manner of a turnover. An effective wrapper for such foods must be able to withstand the cooking process, or at least reheating of pre-cooked foods, and must retain the natural juices and seasonings, while allowing excess steam to escape during cooking to avoid bursting of the wrapper. In addition the wrapper should be easy to open, even when hot, and be of a very simple nature so that manufacture is economical.

Some food wrappers are closed by stitching, but the bulky wrapped packages are difficult to handle and position for such an operation in the automatic machinery normally used for large volume production. Other wrappers are adhesively sealed, but the high cooking temperatures necessary with some products to meet the requirements of health authorities often break down the adhesive and could cause contamination of the food if not properly handled. Tear strips or strings held in place by adhesive or by adhered cover strips usually become loose during cooking and fail to open the wrapper properly.

The primary object of this invention, therefore, is to provide a food wrapper which will withstand any conventional cooking process without deteriorating and will retain natural juices and seasoning in the product.

Another object of this invention is to provide a food wrapper incorporating a tear thread stitched in place, which will not become loose and is reliable in operation to open the wrapper for substantially the full length of the food product.

Another object of this invention is to provide a food wrapper in which the perforations made by the stitched tear thread serve conveniently as limited vents to permit excess steam to escape during cooking.

A further object of this invention is to provide a food wrapper which is extremely simple to manufacture and which is easily handled by automatic machinery or can be wrapped manually.

The construction of the wrapper and a typical use are illustrated in the drawing, in which.

Similar characters of reference indicate similar or identical elements and portions throughout the specification and throughout the views of the drawing.

The wrapper 10 is composed of an inner sheet 12 of rectangular form, and an outer sheet 14 of similar length but slightly narrower. Inner sheet 12 is of moisture impermeable, heat resistant paper, such as certain types of resin impregnated paper, vegetable parchment or glazed paper resembling parchment, or sized paper.

There are numerous paper or paper-like materials having the required moisture and temperature resistant properties and it is not desired to be limited to a specific material. The outer sheet is preferably moisture resistant to the extent that it will not disintegrate during cooking or freezing, but need not be of the quality of the inner sheet which is exposed to juices, acids, or other constituents of the food product. Some types of plastic are capable of withstanding the heat of cooking and one or both of the sheets could be of plastic material. The two sheets may be merely placed together, or may be bonded or laminated in any suitable manner. More than two sheets may be used if necessary for special products, or to incorporated labelling, while for certain purposes a single sheet with suitable coating or impregnation would be satisfactory. In the preferred form illustrated two separate sheets are used, but the specific materials and construction are not nearly as important as the venting and opening means hereinafter described.

Figure 6:
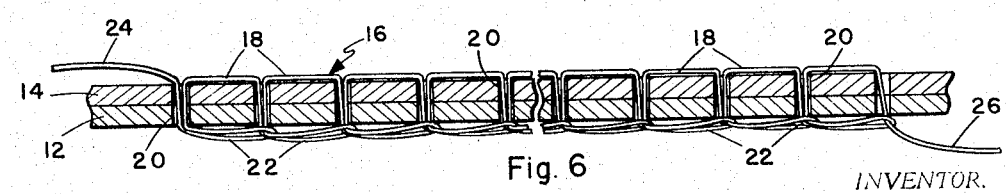
FIGURE 6 is an enlarged sectional view taken on line 6—6 of FIGURE 4.

Extending along the wrapper 10, substantially on the center line thereof, is a tear thread 16 stitched through the wrapper, the length of the line of stitching being approximately the length of the food product to be enclosed in the wrapper. With the two sheet wrapper shown the stitching serves to hold the sheets in alignment during the handling and wrapping process. The stitching is the well known chain stitch utilizing a single thread for simplicity of operation. When stitched with the outer sheet 14 uppermost the chain stitch provides a row of single thread bridge sections 18 between the needle perforations 20 along the outer sheet, with the interlocking loops 22 along the inner surface of inner sheet 12. A portion of thread of sufficient length for gripping is left protruding from one end of the stitching on the outer sheet 14 to provide a pull tag 24. As will be seen in FIGURE 6, this pull tag 24 is at the starting end of the line of stitching and, due to the nature of the chain stitch, tension on the pull tag will tighten the stitching instead of unravelling the thread. At the other end of the line of stitching a tail end 26 of thread is left protruding from the inner sheet 12 to prevent inadvertent unravelling of the stitching by the thread slipping out of the final loop. Since the tail end 26 will be enclosed within the wrapper in use, there is no danger of the tear thread being unravelled during handling. The stitching as illustrated, with the pull tag 24 and tail end 26 incorporated, can be applied by the mechanism shown and described in my U.S. Patent No. 3,187,700, entitled, Sewing Machine Having Automatic Interrupter.

With the two sheets secured together one or both side edges of the inner sheet 12 will project beyond the outer sheet 14 to provide extended borders 28. These borders facilitate handling manually or by automatic machinery when separating wrappers from a stack during the wrapping process.

Figure 1:
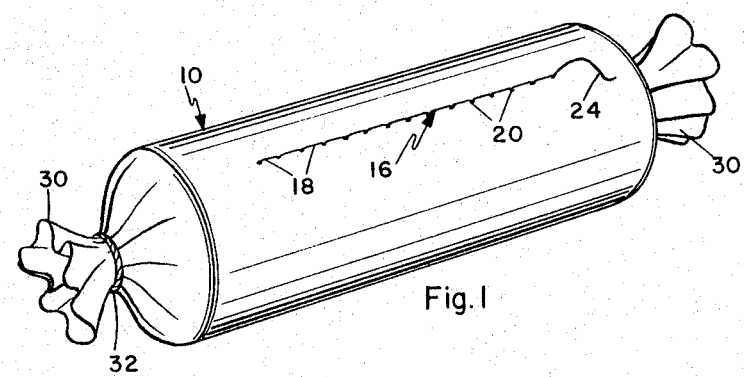
FIGURE 1 is a perspective view of a wrapped food product, such as a tamale.
Figure 2:
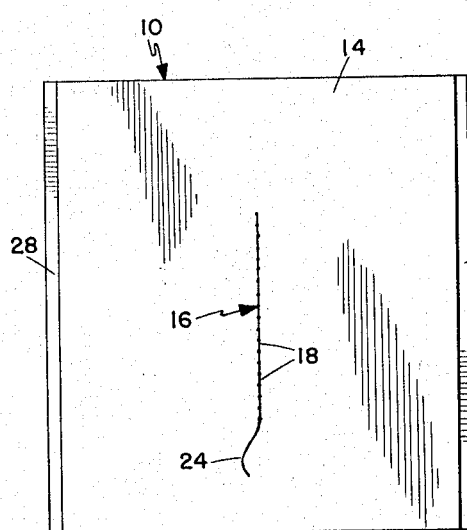
FIGURE 2 is a plan view of the outer side of the wrapper.
Figure 3:
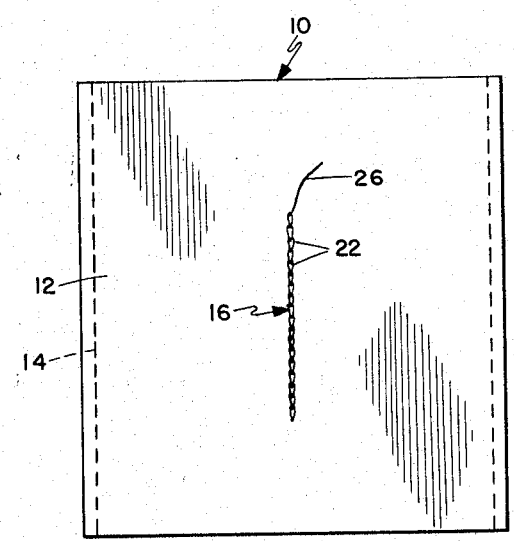
FIGURE 3 is a plan view of the inner side of the wrapper.

With a food product of elongated and somewhat cylindrical form, such as a tamale, the wrapper 10 is rolled around the food product with the tear thread 16 extending longitudinally, the width of the wrapper being sufficient to provide a good overlap of the side edges. The excess end portions of the wrapper are then gathered, as at 30 in FIGURE 1, and secured by ties 32, which may be of string, wire, rubber bands or similar means which can hold the gathered ends securely closed. If plastic material is used in the wrapper it may be desirable to use heat sealing to close the ends. It should be noted that the tear thread stitching is in no way used to secure or close the wrapper around the food product.

Figure 4:
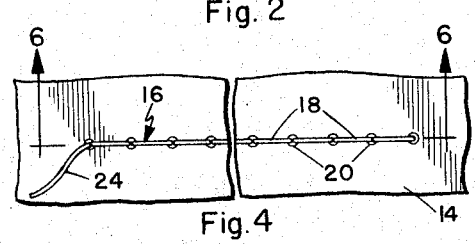
FIGURE 4 is an enlarged detail of the tear thread stitching on the outer surface.
Figure 5:
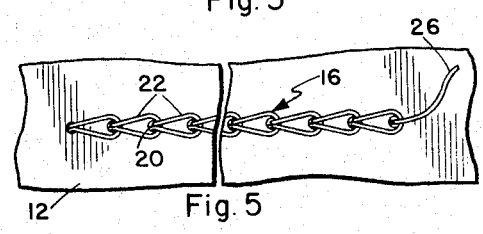
FIGURE 5 is an enlarged detail of the stitching on the inner surface.

When the food product is cooked or reheated while still in the wrapper, excess steam is vented in a novel manner to avoid bursting the wrapper. In making each stitch the needle and two thicknesses of thread penetrate the wrapper, the resultant perforations 20 thus being larger than the threads left therein, as indicated in FIGURE 4. While in actual practice these perforations are quite small, there is ample ventilation area to release the small amount of vapor produced in cooking the contained food product, but the perforations are small enough to prevent loss of juices.

After the food is cooked and ready for serving the wrapper is opened by pulling on the pull tag 24. The single continuous thread used in the chain stitch ensures a positive and neat cutting action through the wrapper, the tear thread being stripped completely away and discarded, leaving a clean slit substantially the full length of the package. By pushing the ends of the package together the slit is opened up and the food product can be removed or eaten directly from the wrapper.

While a generally cylindrical package is illustrated, it will be evident that the wrapper is adaptable to a wide variety of food products which can be fully enclosed in the wrapper.

It is understood that minor variation from the form of the invention disclosed herein may be made without departure from the spirit and scope of the invention, and that the specification and drawings are to be considered as merely illustrative rather than limiting.

I claim:
1. A food container which also serves as a cooking utensil and a dish from which cooked food can be eaten, directly, comprising:
 (a) a substantially cylindrical container, in which solid, pliable food is packed;
 (g) said container being made of yieldable sheet material which is moisture impermeable and is resistant to cooking heat;
 (c) said sheet material being of sufficiently greater axial length than the container to permit the ends thereof to be folded over to form sealed end closures for said container;
 (d) a tear thread stitched through said sheet and spaced from the ends thereof which extends longitudinally for a major portion of the central length of said containers;
 (e) the respective holes through which said tear thread is stitched being sufficiently larger than the tear thread passing therethrough to provide ample space for venting of cooking vapors during heating, but small enough to prevent loss of juices;
 (f) the length of said stitched tear thread being sufficient to permit said container to be opened longitudinally and then compressed from the ends thereof to form an open top, substantially circular, deep dish with the formely stitched edges being the open upper periphery thereof.

2. The food container as set forth in claim 1 wherein:
 (a) said tear thread is a continuous single thread applied in a chain stitch with the loops thereof along the inner surface of said sheet material and the single thread bridge portions along the outside of said sheet material.

3. The food container as set forth in claim 1, wherein:
 (a) said stitched thread has a pull tag end disposed on the outer side of said sheet material, and a tail at the opposite end of said stitched thread which is disposed within said container and anchored between said food material and said sheet material.

4. The food container as set forth in claim 1, wherein:
 (a) said container has a longitudinally extending seam formed by the joinder of the side edges of said sheet material.

References Cited by the Examiner
UNITED STATES PATENTS

| | | | |
|---|---|---|---|
| 2,323,779 | 7/1943 | Kennedy | 229—51 |
| 2,410,206 | 10/1946 | Freeman | 99—176 |
| 2,655,450 | 10/1953 | Ames | 99—175 |
| 2,827,939 | 3/1958 | Ames | 150—1 |
| 2,952,399 | 9/1960 | Searle | 229—66 |
| 3,038,811 | 6/1962 | Reading | 99—171 |

FOREIGN PATENTS

| | | |
|---|---|---|
| 189,891 | 11/1906 | Germany. |
| 948,589 | 9/1956 | Germany. |

JOSEPH R. LECLAIR, *Primary Examiner.*

DAVIS T. MOORHEAD, *Examiner.*